Feb. 5, 1935.  A. R. PACKARD  1,990,090
VALVE OPERATING MECHANISM
Filed April 19, 1933  5 Sheets-Sheet 1

INVENTOR,
Alfred R. Packard,
BY
Harry W. Bowen.
ATTORNEY.

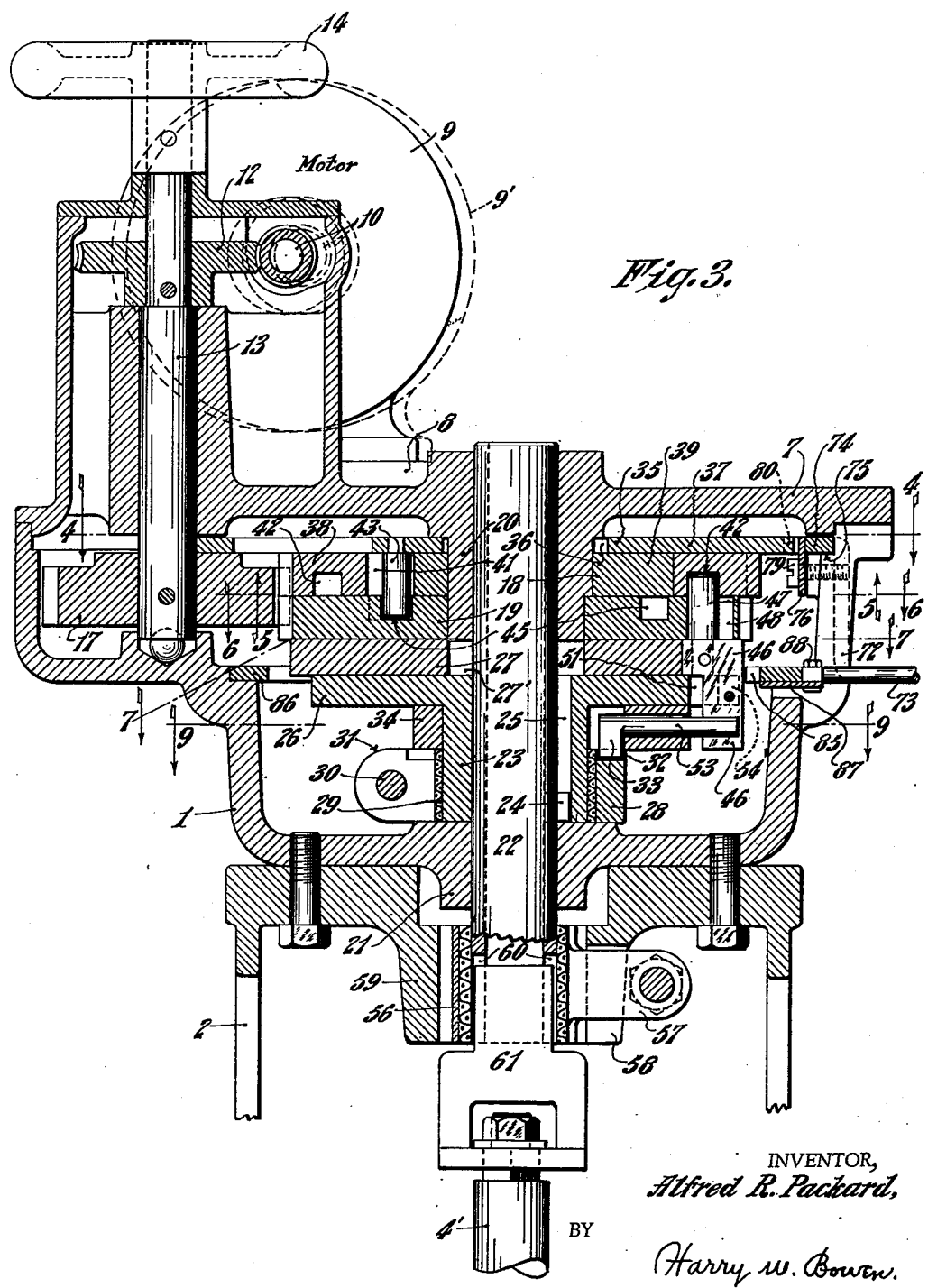

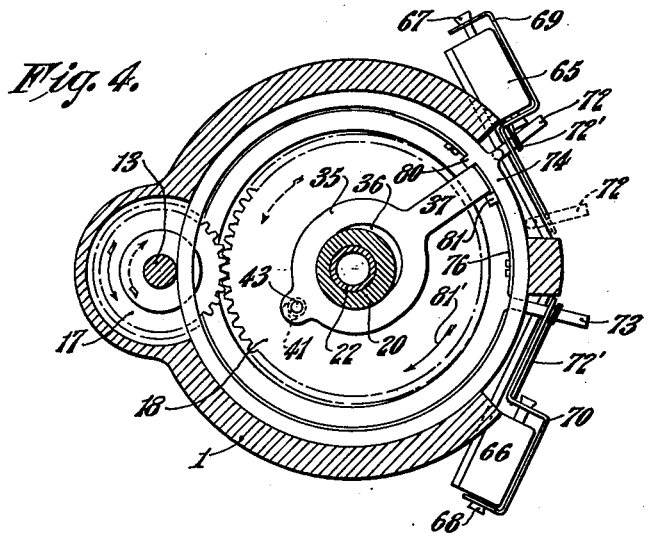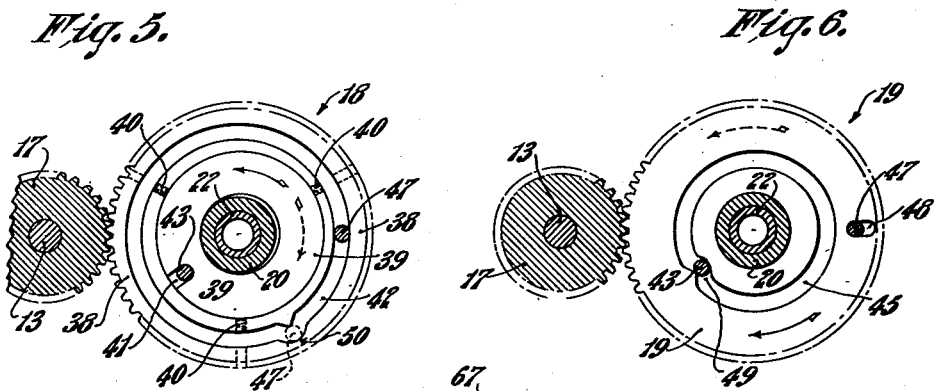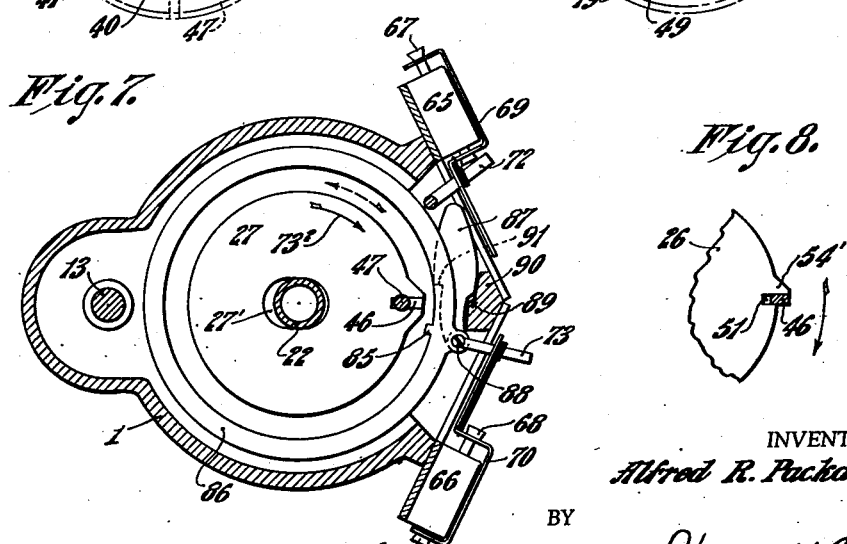

Feb. 5, 1935.　　　A. R. PACKARD　　　1,990,090
VALVE OPERATING MECHANISM
Filed April 19, 1933　　　5 Sheets-Sheet 4
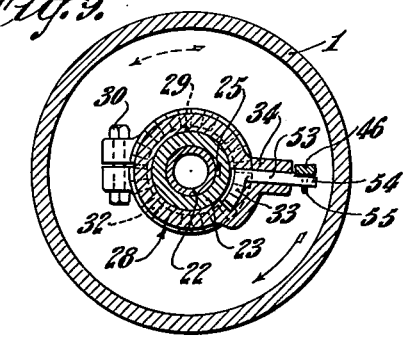
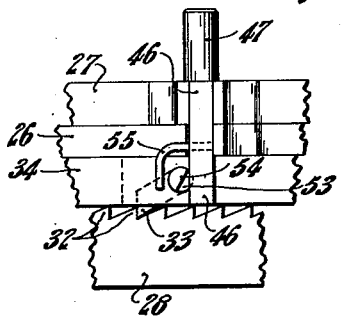
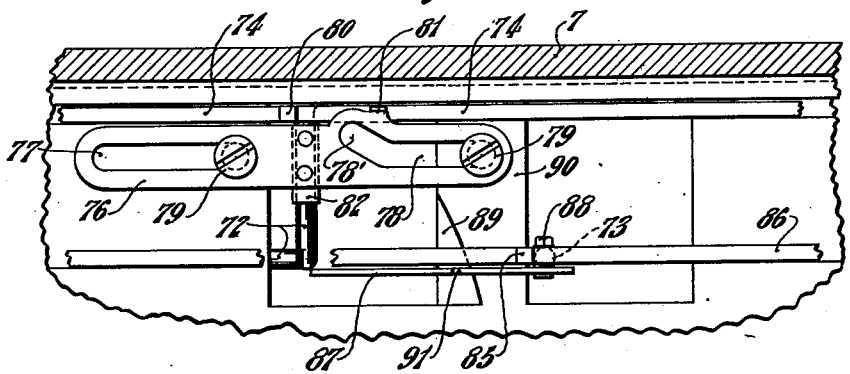
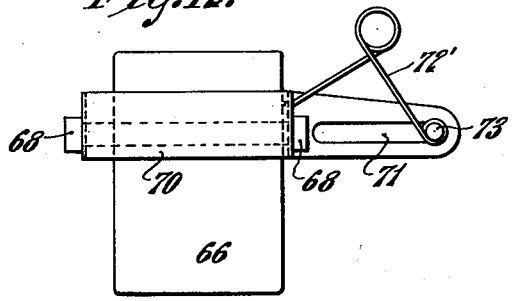
INVENTOR,
Alfred R. Packard,
BY
Harry W. Bowen,
ATTORNEY.

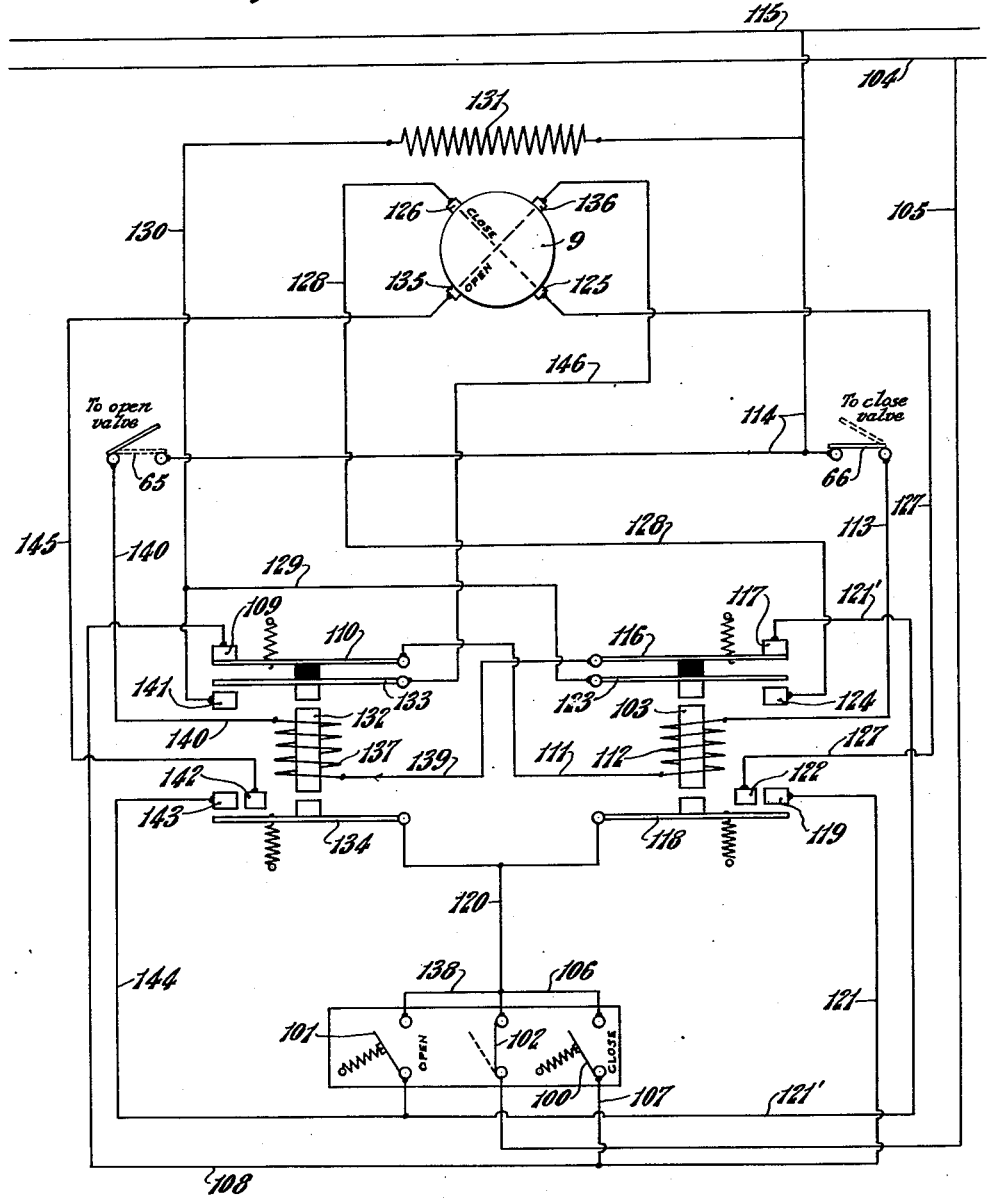

Patented Feb. 5, 1935

1,990,090

UNITED STATES PATENT OFFICE 1,990,090

VALVE OPERATING MECHANISM

Alfred R. Packard, Springfield, Mass.

Application April 19, 1933, Serial No. 666,796

19 Claims. (Cl. 137—139)

My invention relates to improvements in valve-operating mechanisms, and more particularly to that type of operating mechanism which is electrically driven and controlled.

An object of my invention is to provide, in combination with a valve having an operating spindle, means for positively driving the valve spindle through a complete cycle from open position to closing position and back to open position, with the exception of a portion of the cycle including a part of the last closing turn of the spindle and the first opening turn of the spindle, and means for frictionally driving the spindle for closing the valve during that part of the last closing turn of the spindle, when the positive drive is released.

A further object of my invention is to provide, in such a mechanism, a dwell period between the starting of the mechanism, to open the valve, and the locking of the positive driving means with the valve spindle. This dwell period permits the electric motor to attain full speed without load, and utilizes the momentum of the already moving parts of the mechanism to break, or start, moving the valve disc away from its seat.

Valve-operating mechanisms, incorporating a friction drive, are old in the art. They are not practical, because due to differences in resistance encountered during certain periods of travel, such as the start of the opening and closing movements, slipping occurs, and timing is changed, resulting in faulty operation, leaving the valve only partly open, or partly shut.

Positively driven valve-operated mechanisms are not practically efficient, because of the absolutely accurate timing required in the operating mechanism, motor, and switches, and also because of the uneven strain on the motor and the mechanism caused by binding of the valve on its seat.

These objections are eliminated by my invention, which utilizes a combination of positive and friction drives and a dwell period at the start of the opening movement.

Broadly, my invention comprises a shaft, means for connecting the shaft to the spindle of a valve, a driving hub keyed to the shaft, a second driving hub frictionally secured to the first driving hub, a reversible motor, driving members operably connected to the motor,—means for operably connecting the driving members and the driving hub, means for operably connecting the driving members and the second driving hub, when the keyed driving hub is disconnected, and means operated by the driving members for opening and closing the electric circuits to the motor. My invention is particularly designed for opening and closing globe valves, although it is not intended to be limited to such valves.

A preferred embodiment of my invention is illustrated in the accompanying drawings, in which:

Fig. 3 is a vertical, sectional, view of the valve-operating mechanism on a plane passing through the valve stem, and showing the gearing and operating mechanism between the motor and valve stem.

Fig. 4 is a plan, sectional, view on the line 4—4 of Fig. 3.

Fig. 5 is a partial, underside, plan, sectional, view on the line 5—5 of Fig. 3, illustrating the upper driving gear.

Fig. 6 is a partial, plan, sectional, view on the line 6—6 of Fig. 3, illustrating the lower driving gear.

Fig. 7 is a plan, sectional, view on the line 7—7 of Fig. 3, illustrating the driving disc which is the connecting means between the two driving gears and the driving hubs.

Fig. 8 is a partial, plan, view of the flange on the keyed driving hub, showing the driving key engaged in the slot in the flange.

Fig. 9 is a plan, sectional, view on the line 9—9 of Fig. 3, illustrating the driving means for the frictional drive hub.

Fig. 10 is a partial, elevational, view, illustrating the driving key and its relation to the driving hubs.

Fig. 11 is a developed, elevational, view of the operating mechanism for the make and break switches.

Fig. 12 is a diagrammatic view of one of the make and break switches, and

Fig. 13 is a wiring diagram, illustrating the controls for the motor and their co-operation with the make and break switches.

Figure 1:
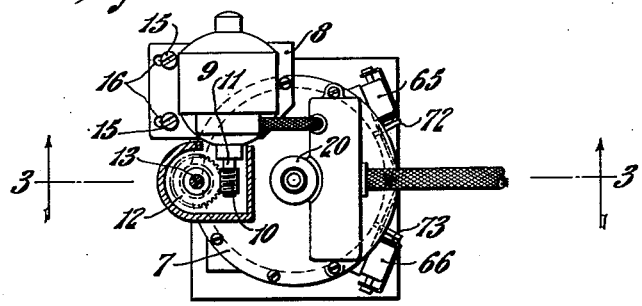
Fig. 1 is a plan view of my valve-operating mechanism.
Figure 2:
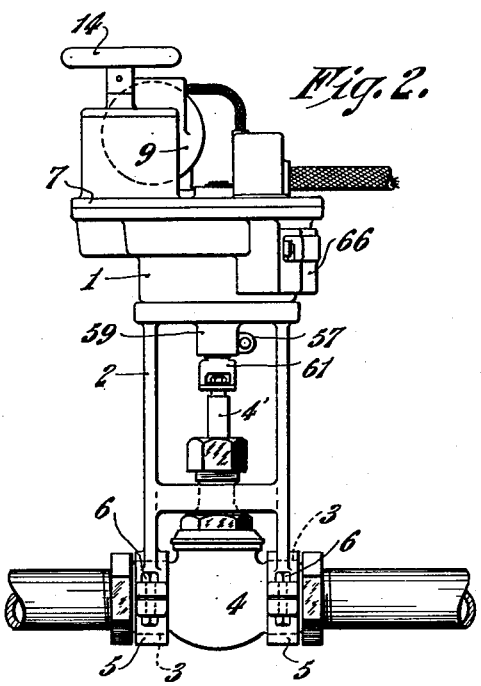
Fig. 2 is an elevational view of the operating mechanism secured to and supported on a valve of the "globe" type.

The various figures of the drawings illustrate the movable parts in their relative positions, when the valve spindle is at the top of its travel, and with the operating mechanism in position to start the downward movement of the valve spindle.

Referring now to the drawings in detail, in which like numerals refer to like parts throughout:

The main casing member 1 is supported on the frame 2, which is secured on flanges 3 of the globe valve 4, by means of caps 5 and screws 6. The cover, or cap member 7, fitted over the casing 1, has formed thereon the shelf 8 on which is supported the reversible electric motor 9. The worm 10, secured on the shaft 11, of motor 9, is normally in engagement with worm gear 12 secured on shaft 13. A handwheel 14 is also secured to the upper end of the shaft 13 for manual operation of the valve. When it is desired to operate the valve manually, the bolts 15 in slots 16 are loosened, and the motor disengaged from the worm gear 12, as indicated by dotted lines 9', in Fig. 3. Gear 17, secured to the lower end of the shaft 13, meshes with the two gears 18 and 19, which are revolvably secured on the hub 20, formed on the cover, or cap, member 7. The main casing member 1 is formed with the hub 21, and the hubs 20 and 21 serve as bearings for the shaft 22, which is connected to the valve stem. The driving hub 23 is secured to the shaft 22 with the key 24 in the elongated key slot 25, to provide for vertical travel for the type of valve known as "rising spindle valves", and is formed with the flange portion 26, on which is slidably supported the driving disc 27, having the elongated slot 27'. (See Fig. 7.) The friction-clamping collar 28, having the friction brake lining fabric 29, is secured on the driving hub 23, frictional contact between the collar 28 and hub 23 being adjustable by means of the bolt 30. The upper face 31 of the clamping collar 28 is formed with the ratchet teeth 32, which are engaged by the rotatable pawl 33, supported in the pawl carrier member 34, (see Figs. 9 and 10), and operated, as will be described later.

The switch-operating disc 35 formed with the elongated opening 36, is slidably located on the hub 20, and is formed with the finger portion 37, (see Fig. 4), which operates the switch 65. The upper gear 18 (see Fig. 5) is made in two parts, the outer gear ring 38 and the inner ring 39. The outer gear ring 38 is secured to the inner ring 39 by set screws 40. The inner ring 39 is formed with the slot 41, and the outer ring 38 is formed with the cam groove 42. By loosening the three set screws 40, the relative, angular, positions of the slot 41 and the recess 50 of the cam groove 42 may be adjusted to adapt the mechanism to varying degrees of travel of the valve spindle 4'. The switch-operating disc 35 has secured thereto the depending pin 43, which is located in the slot 41 in the inner ring 39 of the upper gear 18, and in the cam groove 45, formed in the lower gear 19, as shown in Figs. 5 and 6. The positive, driving disc 27, below the gear 19, has secured therein the driving key 46, to which is secured the upwardly extending pin 47, which is located in the slot 48, formed in the lower driving gear 19 and the cam groove 42, formed in the lower face of the upper driving gear ring 38. The upper driving gear ring 38 is formed with a relatively greater number of teeth than the lower gear 19, one having 64 and the other 65. As both gears are engaged and driven by the same gear 17, on the shaft 13, the result is to produce relative, annular, movement between the two gears 18 and 19, on the hub 20. This relative movement of the gears 18 and 19 serves to bring the pin 43 into engagement with the offset portion 49 of the cam groove 45 of the lower gear 19, and, the pin 47 on the driving disc 27, into engagement with the offset portion 50 of the cam groove 42, in the upper gear 18, at predetermined periods, during the vertical travel of the valve spindle. The result of this engagement is to move the pin 43 inward toward the shaft 22, (see Figs. 5 and 6), and the pin 47 outward away from the shaft 22, both in a radial direction. The purpose of these movements will be fully explained later on in the operation.

The driving key 46 is normally located in the slot 51, formed in the flange 26 of the driving hub 23. (See Figs. 3 and 8.) In this position, the key 46 serves as a positive connection between the motor 9 and shaft 22, through the lower gear 19, slot 48 therein, and pin 47. When the key 46, which is secured to the pin 47, is moved radially outward by engagement of the pin 47 in the offset portion 50 of the cam groove 42, it is released from engagement with the slot 51, and impinges against the rotatable shaft 53, (see Figs. 9 and 10), formed on the pawl 33. The shaft 53 is formed with the driving edge 54 against which the key 46 impinges, thus tending to revolve the shaft 53 and force the pawl 33 into engagement with the teeth 32 on the friction collar 28. Thus, the shaft 22 and spindle 4' are positively driven during all of the closing movements of the valve, except a portion of the last turn before seating, at which time the shaft 22 is frictionally driven by the brake lining 29. As the valve comes to its seat, slippage occurs between the hub 23, keyed to the shaft 22 with the key 24, and the collar 28, causing annular movement of the key 46, relative to the slot 51 in the driving hub 23, as shown in Fig. 8. This annular movement provides for a dwell period, when the mechanism is started in the reverse direction to open the valve, while the key 46 is returning to a position opposite the slot 51. As soon as the key 46 impinges against lug 54', formed on the flange 26 of the driving hub 23, (see Fig. 8), the driving hub 23, shaft 22, and spindle 4' are positively driven, and relative, angular, movement, between the gears 18 and 19, returns the key 46 into the slot 51. A hook 55, secured in the driving key 46, retains the shaft 53 of the pawl 33 and holds it, at all times, in close proximity to the key 46. The shaft 22 is prevented from accidental slipping and maintained in proper relation with the other moving parts by the friction collar 56, the clamping ears 57 of which are held in position by slot 58, formed in the hub 59 on the frame 2. The lower end of the shaft 22 is formed with slots 60, in which is engaged the coupling plate 61 of the valve spindle 4'.

Switches 65 and 66, secured on the casing member 1, are included in the wiring circuits to the electric motor 9. The switch 65 is included in the circuit which actuates the motor 9 to open the valve 4, and the switch 66 is included in the circuit which actuates the motor 9 to close the valve 4. The switch 65 is operated by movement of the finger 37 on the disc 35, and the switch 66 is operated by movement of the driving key 46. When the valve 4 is in its extreme, open position, the switch 66 is closed, or "on", and the switch 65 is open, or "off". When the valve 4 is in extreme, closed, position, the switch 65 is closed, or "on" and the switch 66 is open or "off". At any intermediate point in the travel of the valve spindle, either opening or closing, both switches 65 and 66 are electrically closed, so that the motor 9 may be actuated to move the valve spindle, either up or down. The switch-operating rods, or legs, 67 and 68 of the switches 65 and 66, respectively, have secured thereto the movable plates 69 and 70, which are formed with slots 71, in which are slidably located the switch-actuating pins 72 and 73. The pin 72 is secured to the switch ring 74, which is rotatably supported on the annular shoulder 75, formed in the casing 1. Directly beneath the switch ring 74, (see Fig. 11), the slidable plate member 76, formed with slots 77 and 78, is slidably secured on the inside of the casing member 1, by engagement of the screws 79 in the slots 77 and 78. The rotatable switch ring 74 is formed with the inwardly, projecting lug 80, and the plate 76 is formed with the inwardly, projecting lug 81. In the position, indicated in Fig. 4, the pin 43 has been moved inwardly by engagement in the recess 49 of the cam groove 45, thus moving the finger 37 outwardly, into engagement with the lug 80, on the switch ring 74. When the valve is completely, or fully opened, the finger 37 is positioned between the lug 80 and the lug 81, as indicated in Fig. 4. At the start of the downward movement of the valve spindle 4', as shown by arrow 81', the finger 37 engages the lug 81, and, as the plate 76 is secured to pin 72, by the channel-shaped member 82, the plate 76 and pin 72 are moved in a clockwise direction. Springs 72', (see Fig. 12), secured to pins 72 and 73 and to the plates 69 and 70, respectively, serve to close switches 65 and 66 at the first movement of pins 72 and 73. Elongated slots 71, in plates 69 and 70, permit travel of pins 72 and 73, after switches 65 and 66 have been opened, such travel being caused by momentum of the motor and mechanism, after circuits are opened. This construction prevents pins 72 and 73 from coming into contact with and damaging switches 65 and 66, during overtravel of the motor 9, after the current is cut off. Thus, when pin 72 is moved by plate 76, the switch plate 69 is moved and the switch 65 closed. At this time, the upwardly extending end 78' of the slot 78 is engaged by the screw 79, thus forcing the lug 81 downward out of engagement with the finger 37, which slides over the top of the lug 81. Before the finger 37 has made a complete revolution, the pin 43 is moved outward, so that on the next turn, the finger 37 clears the lug 80. At the end of the opening movement of the valve spindle 4', the action is reversed, the finger 37 engaging the lug 80, moving the pin 72 and opening the electric switch 65, and also moving the plate 76, until the lug 81, rises behind the finger 37, as indicated in Figs. 4 and 11.

The switch 66 is operated in a similar manner by the driving key 46. At the end of the closing movement of the valve spindle 4', the key 46 is moved outwardly, by engagement of the pin 47 in the recess 50 of the cam groove 42, and is thus brought into engagement with the lug 85, formed on the rotatable switch ring 86, (see Figs. 7 and 11). The pin 73, secured to the rotatable ring 86, is moved in a clockwise direction, as shown by arrows 73², opening the switch 66'. The latch plate member 87, pivotally secured to the ring 86 at 88, is forced inwardly by engagement against the cam surface 89 of the post 90 on the casing 1, until the recess 91 is in position to be engaged by the key 46, at the beginning of the opening movement of the valve spindle. This engagement moves the ring 86 and pin 73 in an anti-clockwise direction, closing the switch 66. The cam surface 89 then permits the key 46 to force the latch 87 outwardly and to pass by the latch 87. Before the first revolution of the key 46, the pin 47 and key 46 have been moved inwardly, so that the key 46 passes by the lug 85.

A preferred system of wiring for my valve-operating mechanism is illustrated in Fig. 13, although I do not confine myself to this system, as it will be readily understood by one skilled in the art, that many other systems and variations are equally adaptable for operation of the mechanism illustrated. In the system illustrated, the circuits are controlled by starting switches 100, and 101, and the cut-out switch 102, in co-operation with the control switches 65 and 66. Opening of the cut-out switch 102 stops the mechanism at any time and in any position. Closing of the starting switch 100 will start downward movement of the valve spindle, if the switch 66 is closed, or in other words, at all times, except when the valve spindle is at the end of its downward, or seating movement. Closing of the starting switch 101 will start upward movement of the valve spindle, if the switch 65 is closed, or in other words, at all times, except when the valve spindle is at the end of its upward, or unseating movement. The circuits are so arranged that only momentary closing of the starting switches is required, after which the movement will continue, until either switch 65 or 66 opens. When switch 100 is closed and switch 66 is closed, the magnet 103 is energized by a circuit comprising main line 104, wire 105, switch 102, wire 106, switch 100, wires 107, 108, contact 109, plate 110, wire 111, coil 112, wire 113, switch 66 wire 114 to main line 115. When the magnet 103 is energized, the contact between plate 116 and 117 is broken, thus opening the circuit through the switch 101, and preventing any damage to the mechanism, which might occur through accidental closing of both switches 100 and 101. At the same time, contact is made between the plate 118 and contact 119, which completes a circuit to the coil 112, which by-passes the switch 100, as follows: line 104, switch 102, wire 120, plate 118, contact 119, wire 121, wire 108, contact 109, plate 110, wire 111, coil 112, wire 113, switch 66, wire 114, to line 115. This latter circuit continues to energize the coil 112, until the switch 66 is opened by the valve-operating mechanism. With the magnet 103 energized by coil 112, contact is made between plate 118 and contact 122, and plate 123 and contact 124, which closes the circuit through terminals 125 and 126 of motor 9, as 144, contact 117, plate 116, wire 139, coil 137, wire plate 118, contact 122, wire 127, motor terminal 125, motor 9, terminal 126, wire 128, contact 124, plate 123, wire 129, wire 130, field 131, wire 114 to line 115. This circuit actuates the motor 9 to operate the mechanism in the direction, indicated by full line arrows in Figs. 4, 5, 6, 7, 8, and 9, to close the valve 4.

The circuits for actuating the motor 9, to operate the mechanism to open the valve 4, as indicated by dotted arrows in Figs. 4, 5, 6, 7, 8, and 9, operate through the switch 101, magnet 132, plates 110, 133, and 134, switch 65, and terminals 135 and 136 of motor 9. The circuit through switch 101 to coil 137, from line 104, wire 105, switch 102, wire 138, switch 101, wire 121', contact 117, plate 116, wire 139, coil 137, wire 140, switch 65, wire 114, to line 115, energizes the magnet 132, breaks contact between plate 110 and contact 109, thus opening the circuits to coil 103, through switch 100, and makes contact between plate 133, contact 141, plate 134, and contacts 142 and 143. The secondary circuit, through coil 137 around switch 101, is from line 104, wire 105, switch 102, wire 120, plate 134, contact 143, wire 144, contact 117, plate 116, wire 139, coil 137, wire 140, switch 65, wire 114 to line 115. The circuit, through terminals 135 and 136 of motor 9, is from line 104, wire 105, switch 102, wire 120, plate 134, contact 142, wire 145, terminal 135, motor 9, terminal 136, wire 146, plate 133, contact 141, wire 130, field 131, wire 114, to line 115.

The operation may be described as follows: with the valve in extreme opening position, the switch 66 is closed and the switch 65 open. Closing of the opening switch 101 will complete no circuits, as switch 65 is open, therefore, the motor cannot be actuated to move the mechanism in opening direction. Closing of the closing switch 100 will actuate the motor to move the mechanism in closing direction, through switch 66. At the start of the closing movement, switch 65 is closed by finger 37 and pin 72. Driving hub 23 is driven by key 46, and continues to be driven by key 46, until the valve approaches its seat. At this point, key 46 is released from positive engagement with flange 26 on hub 23 and continues to drive hub 23, through friction collar 28. As the valve is seated, key 46 passes beyond slot 54 in the driving hub flange and operates pin 73 to open switch 66. With the valve closed or seated, switch 65 is closed and switch 66 open. Circuits, through closing switch 100, are maintained open by switch 66, and the mechanism cannot be further actuated in opening movement. When the opening switch 101 is closed, the motor 9 is actuated to move the mechanism in opening direction, and the motor and mechanism attain full speed, before picking up the load of unseating the valve, while key 46 is returning into alignment with slot 51. During this period, switch 66 has been closed by key 46, latch member 87, and pin 73. At the end of this period, key 46 impinges against lug 54 on flange 26 of driving hub 23; is retained into engagement in slot 51, and continues to positively drive the valve spindle, until extreme open position is reached. As the valve spindle approaches extreme open position, switch 65 is opened by finger 37 and pin 72. At any intermediate point, in the travel of the valve spindle, both switches 65 and 66 are closed, and the mechanism may be operated in either direction by closing of switch 100, or 101, as desired. Opening of switch 102 breaks all circuits, and stops the mechanism in any position, at any time.

What I claim is:—

1. A valve-operating mechanism comprising in combination, a valve, a stem connected thereto, a motor for operating the valve, means for supplying energy to the motor, means interposed between the valve stem and motor for positively moving the valve towards its seat during all portions of the valve-closing movements except for a portion of the last closing turn, means for frictionally moving the valve to its seat with a uniform torque effect during the final valve-closing movements and means for disconnecting the source of energy from the motor for the purpose of stopping the motor after the valve has been seated.

2. A valve-operating mechanism comprising in combination, a valve, a stem connected thereto, a motor for operating the valve, means for supplying energy to the motor, means interposed between the valve stem and motor for positively moving the valve towards its seat during all portions of the valve-closing movements except for a portion of the last closing turn, and means for frictionally moving the valve to its seat during the final valve-closing movements, said latter means including a friction brake device which imparts a uniform brake or torque effect between the positive driving means and the valve stem, and means for setting the said brake device into operation only after the valve stem has travelled through a definite vertical portion of its travel and before the source of energy is disconnected.

3. A valve-operating mechanism comprising in combination with the valve and its stem, a source of motive power, a gear driven thereby, two gears both meshing with the said gear, said two gears having a relatively different number of teeth for producing a differential or relative angular movement between the two gears, a driving hub connected to the valve stem, co-operating means between the gears for positively actuating the valve stem during a portion of its travel, and means for releasing the positively-actuating means of the gears at the end of such travel and automatically interposing a friction drive to complete the travel of the valve to its seat.

4. A valve-operating mechanism comprising in combination with the valve and its stem, a source of motive power, a gear driven thereby, two gears both meshing with the said gear, said two gears having a relatively different number of teeth for producing a differential or relative angular movement between the two gears, a driving hub connected to the valve stem, co-operating means between the gears for positively actuating the valve stem during a portion of its travel, and means for releasing the positively-actuating means of the gears at the end of such travel and automatically interposing a friction drive to complete the travel of the valve to its seat, said means between the two gears comprising a cam groove in one gear, a pin in the groove, a drive disc connected to the valve stem, a key on the drive disc actuated by the other gear to move the disc radially, a pawl actuated by the key, a toothed member actuated by the pawl, and friction brake means between the toothed member and the valve stem.

5. In combination, a valve-operating mechanism, a drive shaft, upper and lower cap members having supporting bearings for the shaft, a valve stem connected to the drive shaft, a drive hub keyed to the drive shaft for permitting axial movement of the drive shaft and formed with a slotted flange, a drive gear, connecting means between the drive gear and the slotted flange of the drive hub, means actuated by the drive gear for connecting and disconnecting the drive hub to and from the drive shaft after the drive shaft has made a definite number of revolutions, and means for frictionally driving the valve as it is moved to its seat.

6. A valve-seating and unseating mechanism, having in combination, a motor, a drive gear connected to the motor, a gear operated by the drive gear, a drive shaft for the valve, a driving hub keyed to the drive shaft and formed with a slotted flange, a radially movable driving disc on the drive shaft, and a key in the slot of the flange connecting the said flange with the drive gear and the disc.

7. In a valve-operating mechanism, the combination, of a casing member, a drive shaft therein connected to the stem of a valve to be operated, a drive hub connected to the drive shaft and formed with a flange portion having a slot in its edge and a shoulder adjacent the slot, a motor-driven gear, a gear driven by the motor-driven gear and formed with an elongated slot therein, a pin in said slot having a projection that normally enters the slot in the flange of the driving hub, a second gear operated by the motor-driven gear and formed with a cam groove, in which is located the pin having the projection, whereby the driving hub is connected and disconnected to and from the valve-spindle-operating-shaft when the motor-driven gear is operated.

8. In a valve-operating mechanism, the combination, of a casing member, a drive shaft therein connected to the stem of a valve to be operated, a drive hub connected to the drive shaft and formed with a flange portion having a slot in its edge and a shoulder adjacent the slot, a motor-driven gear, a gear driven by the motor-driven gear and formed with an elongated slot therein, a pin in said slot having a projection that normally enters the slot in the flange of the driving hub—, a second gear operated the motor-driven gear and formed with a cam groove in which is located the pin having the projection, whereby the driving hub is connected and disconnected to and from the valve-spindle-operating shaft when the motor-driven gear is operated, and means actuated by the projection on the pin for imparting a frictional drive to the valve spindle to seat the valve when the projection is disconnected from the flange of the driving hub, the construction and arrangement being such that when the valve is to be unseated the motor-driven gear is operated for a dwell period of time to permit the motor-driven mechanism to reach full speed without load before the projection again engages the slot in the flange of the driving hub for imparting an impulse effect to unseat the valve.

9. In a valve-operating mechanism, an enclosing casing, a drive shaft connected to the valve spindle, means for positively connecting and disconnecting the operating mechanism to the drive shaft, means for driving the drive shaft comprising an adjustably controlled friction drive that operates before the power is disconnected, when the positive means is disconnected, and means for driving the drive shaft through the friction driving means.

10. In a valve-operating mechanism, an enclosing casing, a drive shaft connected to the valve spindle, means for positively connecting and disconnecting the operating mechanism to the drive shaft, means for frictionally driving the drive shaft when the positive means is disconnected, means for driving the drive shaft through the friction driving means, said means comprising a pawl and rack on the second friction driving means and operative connecting means between the positive driving means and the pawl.

11. In a valve-operating mechanism, a motor-operated gear, two gears meshing therewith, a drive shaft connected to the valve stem, a driving hub positively connected to the drive shaft, a driving disc slidably supported on the driving hub, connecting means between the said disc and hub, friction driving means between the disc and hub, means operated by one of the two gears for moving the slidable driving disc to disconnect it from the driving hub and simultaneously throw in the friction driving means, and means operated by the slidable disc for operating an electric switch controlling the motor circuit for closing the valve.

12. In a valve-operating mechanism, a motor-operated gear, two gears meshing therewith, a drive shaft connected to the valve stem, a driving hub positively connected to the drive shaft, a driving disc slidably supported on the driving hub, connecting means between the said disc and hub, friction driving means between the disc and hub, means operated by one of the two gears for moving the slidable driving disc to disconnect it from the driving hub and simultaneously throw in the friction driving means,—means operated by the slidable disc for operating an electric switch controlling the motor circuit for closing the valve, and means operated by the other one of said two gears for operating another electric switch controlling the motor circuit for opening the valve.

13. A valve-operating mechanism, a drive shaft connected to the valve stem, a drive gear, a gear meshing therewith having a grooved cam channel, a slotted plate secured to the gear, means for adjusting the plate relative to the cam portion of the channel for varying the angular positions of the same, and operative connecting means between the gear and the valve stem.

14. In combination, in a valve-operating mechanism an enclosing casing, a cover plate, a drive shaft journaled therein, a drive gear, two gears of different number of teeth journaled on the cover plate and driven by the drive gear, a switch disc, means for operating the same from one of the gears, said drive and valve stem connected to the other gear, means operated by the said other gear for disconnecting the drive shaft at a predetermined relative angular movement of the two gears due to the difference in the number of teeth, means for setting or adjusting the said relation, a switch ring operated by the switch disc and a second switch ring operated by the said other gear when the drive shaft is disconnected, and means for frictionally driving the drive shaft when disconnected.

15. A valve-operating mechanism comprising in combination, positive means for moving the valve through a definite vertical distance prior to its seating, means for disconnecting the said means, frictional means for moving the valve to its seat after being disconnected, means for carrying the valve-actuating means beyond its positive actuating means after disconnecting the same, comprising a friction construction in which the torque is uniform throughout its travel and shutting off the moving means after the valve is seated, whereby a dwell period is provided for unseating the valve when the mechanism is reversed, and is operated at full speed to impart an impulse effect to the valve for unseating the same.

16. A driving mechanism for a valve stem, comprising a drive shaft connected to the valve stem, a drive hub connected to the drive shaft with a key and groove connection for relative vertical movement, two gears having a different number of teeth, a common drive gear therefor, each of the gears having opposing faces and a groove with an offset portion, oppositely extending pins in the grooves, a switch disc operated by one pin, a slidable drive plate operated by the other pin for disconnecting the drive shaft of the spindle at a predetermined period after the drive shaft and spindle have made a definite number of turns depending upon the relative angular positions of the offsets in said grooves of the two gears, said offsets serving to provide a dwell period when the valve is to be unseated and permit the momentum of the moving parts to operate at the end of the dwell period to positively lift or unseat the valve.

17. A valve-operating mechanism comprising a casing, a reversible motor, a drive gear connected thereto, two gears in mesh with the drive gear having a different number of teeth for providing relative angular movement between the same, a valve, operative connecting means between the motor and the valve, electric switches for opening and closing the circuits to the motor for operating the valve, operative connecting means between the two gears and the switches for actuating the switches, a source of electric energy and connection to the motor and switches whereby the valve is operated in opposite directions, as described.

18. A valve-operating mechanism, comprising in combination, an enclosing casing, a reversible electric motor, a source of electric energy, connections therefrom to the motor, switches in the connections, a valve, connecting means between the valve and the motor, means operated by the motor for operating the switches comprising two rotatable ring members, means for actuating the rings in both directions of rotation of the motor, operative connecting means between the rings and the switches comprising pins on said rings engaging said switches, means operably connected to said pins for engaging and disengaging the ring-actuating means comprising a slotted plate slidably secured in the casing and co-operating with one of said rings and a latch pivotally secured on the other of said rings and co-operating with the casing, whereby annular movement of the rings produces annular and vertical movement in the plate and annular and radial movement in the latch for engaging and disengaging the ring-actuating means.

19. A valve-operating mechanism comprising in combination, a casing member, a reversible electric motor, a source of electric energy, connecting circuits between the motor and the source of energy, switches in said circuits, a valve, a spindle on said valve, a driven shaft revolvably secured in said casing and connected to said spindle, a drive shaft revolvably secured in said casing and operably connected to said motor, a gear on said drive shaft, gears on said driven shaft meshing with the gear on said drive shaft, switch rings rotatably supported in said casing member, switch-operating members slidably secured on the gears on said driven shaft, means on said gears for moving said switch-operating members radially relative to said driven shaft, means on said ring members for engaging the switch-operating members when they are moved outwardly in a radial direction, operative connecting means between the ring members and the switches, and cam means for disconnecting the switch-operating members and the ring members after a predetermined annular movement of the ring members.

ALFRED R. PACKARD.